(12) United States Patent
Chang et al.

(10) Patent No.: US 7,218,428 B2
(45) Date of Patent: May 15, 2007

(54) METHOD OF SEQUENCING IMAGE DATA INSIDE MEMORY OF OPTICAL SCANNING DEVICE

(76) Inventors: Tom-Chin Chang, No.22, Da-De Tsuen, Da-Pi Hsiang, Yun-Lin County (TW); Kuo-Jeng Wang, No.14, Kuang-An St., Fong-Kung Li, Hsiao Kang District, Kaohsiung (TW)

( * ) Notice: Subject to any disclaimer, the term of this patent is extended or adjusted under 35 U.S.C. 154(b) by 792 days.

(21) Appl. No.: 10/068,278

(22) Filed: Feb. 6, 2002

(65) Prior Publication Data

US 2003/0147106 A1    Aug. 7, 2003

(51) Int. Cl.
*H04N 1/46*      (2006.01)
*H04N 1/40*      (2006.01)
*H04N 1/00*      (2006.01)

(52) U.S. Cl. .................. 358/524; 358/515; 358/514; 358/505; 358/403; 358/404; 358/444

(58) Field of Classification Search ........ 358/512–514, 358/482, 483, 523, 444, 505, 506, 509, 487, 358/474, 494, 497, 524, 403, 515, 404; 250/208.1, 250/234–236; 348/311, 317, 714; 382/167, 382/162, 303–305
See application file for complete search history.

(56) References Cited

U.S. PATENT DOCUMENTS 5,929,899 A * 7/1999 Takahashi et al. ............ 348/65

\* cited by examiner

*Primary Examiner*—Cheukfan Lee
(74) *Attorney, Agent, or Firm*—Berkeley Law & Technology Group

(57) ABSTRACT

An image data sequencing method for a memory unit inside an optical scanning device. The image data sequencing method is particularly suitable for scanning a line of pixels with each pixel comprising a plurality of primary colors. The image data sequencing method involves scanning a line of pixels to obtain the data for a primary or secondary color. The pixels within the scan line are subdivided into groups. A storage space is reserved both before and after the address space inside the memory unit for holding the scanned primary or secondary color data so that all the primary or secondary color data constituting a pixel are in a fixed sequence next to each other inside the memory unit. When all the primary or secondary color data of pixels within a group are secured, the group of data is released from the memory unit.

15 Claims, 3 Drawing Sheets

$$R_{11}\ N_{11}\ M_{11}\ R_{13}\ N_{13}\ M_{13}\ R_{15}\ N_{15}\ M_{15} \cdots\cdots R_{1(2n-1)}\ N_{1(2n-1)}\ M_{1(2n-1)}$$
$$R_{12}\ N_{12}\ M_{12}\ R_{14}\ N_{14}\ M_{14}\ R_{16}\ N_{16}\ M_{16} \cdots\cdots R_{1(2n)}\ N_{1(2n)}\ M_{1(2n)}$$
$$R_{21}\ N_{21}\ M_{21}\ R_{23}\ N_{23}\ M_{23}\ R_{25}\ N_{25}\ M_{25} \cdots\cdots R_{2(2n-1)}\ N_{2(2n-1)}\ M_{2(2n-1)}$$
$$R_{22}\ N_{22}\ M_{22}\ R_{24}\ N_{24}\ M_{24}\ R_{26}\ N_{26}\ M_{26} \cdots\cdots R_{2(2n)}\ N_{2(2n)}\ M_{2(2n)}$$
$$\vdots \qquad\qquad\qquad\qquad\qquad\qquad\qquad\qquad \vdots$$
$$R_{k1}\ N_{k1}\ M_{k1}\ R_{k3}\ N_{k3}\ M_{k3}\ R_{k5}\ N_{k5}\ M_{k5} \cdots\cdots R_{k(2n-1)}\ N_{k(2n-1)}\ M_{k(2n-1)}$$
$$R_{k2}\ N_{k2}\ M_{k2}\ R_{k4}\ N_{k4}\ M_{k4}\ R_{k6}\ N_{k6}\ M_{k6} \cdots\cdots R_{k(2n)}\ N_{k(2n)}\ M_{k(2n)}$$

$$R_{11}\ G_{11}\ B_{11}\ R_{13}\ G_{13}\ B_{13}\ R_{15}\ G_{15}\ B_{15} \cdots\cdots R_{1(2n-1)}\ G_{1(2n-1)}\ B_{1(2n-1)}$$
$$R_{12}\ G_{12}\ B_{12}\ R_{14}\ G_{14}\ B_{14}\ R_{16}\ G_{16}\ B_{16} \cdots\cdots R_{1(2n)}\ G_{1(2n)}\ B_{1(2n)}$$
$$R_{21}\ G_{21}\ M_{21}\ R_{23}\ G_{23}\ M_{23}\ R_{25}\ G_{25}\ M_{25} \cdots\cdots R_{2(2n-1)}\ G_{2(2n-1)}\ M_{2(2n-1)}$$
$$R_{22}\ G_{22}\ M_{22}\ R_{24}\ G_{24}\ M_{24}\ R_{26}\ G_{26}\ M_{26} \cdots\cdots R_{2(2n)}\ G_{2(2n)}\ M_{2(2n)}$$
$$\vdots \qquad\qquad\qquad\qquad\qquad\qquad\qquad\qquad \vdots$$
$$R_{k1}\ G_{k1}\ M_{k1}\ R_{k3}\ G_{k3}\ M_{k3}\ R_{k5}\ G_{k5}\ M_{k5} \cdots\cdots R_{k(2n-1)}\ G_{k(2n-1)}\ M_{k(2n-1)}$$
$$R_{k2}\ G_{k2}\ M_{k2}\ R_{k4}\ G_{k4}\ M_{k4}\ R_{k6}\ G_{k6}\ M_{k6} \cdots\cdots R_{k(2n)}\ G_{k(2n)}\ M_{k(2n)}$$

$R_{11}$ $R_{12}$ $R_{13}$ ······ $R_{1n}$
$R_{21}$ $R_{22}$ $R_{23}$ ······ $R_{2n}$
⋮ ⋮
$R_{k1}$ $R_{k2}$ $R_{k3}$ ······ $R_{kn}$
$G_{11}$ $G_{12}$ $G_{13}$ ······ $G_{1n}$
$G_{21}$ $G_{22}$ $G_{23}$ ······ $G_{2n}$
⋮ ⋮
$G_{k1}$ $G_{k2}$ $G_{k3}$ ······ $G_{kn}$
$B_{11}$ $B_{12}$ $B_{13}$ ······ $B_{1n}$
$B_{21}$ $B_{22}$ $B_{23}$ ······ $B_{2n}$
⋮ ⋮
$B_{k1}$ $B_{k2}$ $B_{k3}$ ······ $B_{kn}$ $R_{11}$ $N_{11}$ $M_{11}$ $R_{13}$ $N_{13}$ $M_{13}$ $R_{15}$ $N_{15}$ $M_{15}$ · · · · · · · $R_{1(2n-1)}$ $N_{1(2n-1)}$ $M_{1(2n-1)}$
$R_{12}$ $N_{12}$ $M_{12}$ $R_{14}$ $N_{14}$ $M_{14}$ $R_{16}$ $N_{16}$ $M_{16}$ · · · · · · · $R_{1(2n)}$ $N_{1(2n)}$ $M_{1(2n)}$
$R_{21}$ $N_{21}$ $M_{21}$ $R_{23}$ $N_{23}$ $M_{23}$ $R_{25}$ $N_{25}$ $M_{25}$ · · · · · · · $R_{2(2n-1)}$ $N_{2(2n-1)}$ $M_{2(2n-1)}$
$R_{22}$ $N_{22}$ $M_{22}$ $R_{24}$ $N_{24}$ $M_{24}$ $R_{26}$ $N_{26}$ $M_{26}$ · · · · · · · $R_{2(2n)}$ $N_{2(2n)}$ $M_{2(2n)}$
$\vdots$ $\vdots$
$R_{k1}$ $N_{k1}$ $M_{k1}$ $R_{k3}$ $N_{k3}$ $M_{k3}$ $R_{k5}$ $N_{k5}$ $M_{k5}$ · · · · · · · $R_{k(2n-1)}$ $N_{k(2n-1)}$ $M_{k(2n-1)}$
$R_{k2}$ $N_{k2}$ $M_{k2}$ $R_{k4}$ $N_{k4}$ $M_{k4}$ $R_{k6}$ $N_{k6}$ $M_{k6}$ · · · · · · · $R_{k(2n)}$ $N_{k(2n)}$ $M_{k(2n)}$

FIG. 3A $R_{11}$ $G_{11}$ $M_{11}$ $R_{13}$ $G_{13}$ $M_{13}$ $R_{15}$ $G_{15}$ $M_{15}$ · · · · · · $R_{1(2n-1)}$ $G_{1(2n-1)}$ $M_{1(2n-1)}$
$R_{12}$ $G_{12}$ $M_{12}$ $R_{14}$ $G_{14}$ $M_{14}$ $R_{16}$ $G_{16}$ $M_{16}$ · · · · · · $R_{1(2n)}$ $G_{1(2n)}$ $M_{1(2n)}$
$\vdots$ $\vdots$
$R_{k1}$ $G_{k1}$ $M_{k1}$ $R_{k3}$ $G_{k3}$ $M_{k3}$ $R_{k5}$ $G_{k5}$ $M_{k5}$ · · · · · · $R_{k(2n-1)}$ $G_{k(2n-1)}$ $M_{k(2n-1)}$
$R_{k2}$ $G_{k2}$ $M_{k2}$ $R_{k4}$ $G_{k4}$ $M_{k4}$ $R_{k6}$ $G_{k6}$ $M_{k6}$ · · · · · · $R_{k(2n)}$ $G_{k(2n)}$ $M_{k(2n)}$
$R_{(k+1)1}$ $N_{(k+1)1}$ $M_{(k+1)1}$ · · · · · · · · · $R_{(k+1)(2n-1)}$ $N_{(k+1)(2n-1)}$ $M_{(k+1)(2n-1)}$
$R_{(k+1)2}$ $N_{(k+1)2}$ $M_{(k+1)2}$ · · · · · · · · $R_{(k+1)(2n)}$ $N_{(k+1)(2n)}$ $M_{(k+1)(2n)}$
$\vdots$
$R_{(2k)1}$ $N_{(2k)1}$ $M_{(2k)1}$ · · · · · · · · $R_{(2k)(2n-1)}$ $N_{(2k)(2n-1)}$ $M_{(2k)(2n-1)}$
$R_{(2k)2}$ $N_{(2k)2}$ $M_{(2k)2}$ · · · · · · · · $R_{(2k)(2n)}$ $N_{(2k)(2n)}$ $M_{(2k)(2n)}$

FIG. 3B $R_{11}\ G_{11}\ B_{11}\ R_{13}\ G_{13}\ B_{13}\ R_{15}\ G_{15}\ B_{15}\ \cdots\cdots\ R_{1(2n-1)}\ G_{1(2n-1)}\ B_{1(2n-1)}$ $R_{12}\ G_{12}\ B_{12}\ R_{14}\ G_{14}\ B_{14}\ R_{16}\ G_{16}\ B_{16}\ \cdots\cdots\ R_{1(2n)}\ \ \ G_{1(2n)}\ \ \ B_{1(2n)}$ $R_{21}\ G_{21}\ M_{21}\ R_{23}\ G_{23}\ M_{23}\ R_{25}\ G_{25}\ M_{25}\ \cdots\cdots\ R_{2(2n-1)}\ G_{2(2n-1)}\ M_{2(2n-1)}$ $R_{22}\ G_{22}\ M_{22}\ R_{24}\ G_{24}\ M_{24}\ R_{26}\ G_{26}\ M_{26}\ \cdots\cdots\ R_{2(2n)}\ \ \ G_{2(2n)}\ \ \ M_{2(2n)}$ $\vdots \qquad\qquad\qquad\qquad\qquad\qquad\qquad\qquad\qquad \vdots$ $R_{k1}\ G_{k1}\ M_{k1}\ R_{k3}\ G_{k3}\ M_{k3}\ R_{k5}\ G_{k5}\ M_{k5}\ \cdots\cdots\ R_{k(2n-1)}\ G_{k(2n-1)}\ M_{k(2n-1)}$ $R_{k2}\ G_{k2}\ M_{k2}\ R_{k4}\ G_{k4}\ M_{k4}\ R_{k6}\ G_{k6}\ M_{k6}\ \cdots\cdots\ R_{k(2n)}\ \ \ G_{k(2n)}\ \ \ M_{k(2n)}$

FIG. 3C

METHOD OF SEQUENCING IMAGE DATA INSIDE MEMORY OF OPTICAL SCANNING DEVICE

BACKGROUND OF THE INVENTION

1. Field of Invention

The present invention relates to a method of sequencing data inside the memory of an optical scanning device. More particularly, the present invention relates to a method of sequencing image data inside the memory of an optical scanner.

2. Description of Related Art

FIG. 1 is a block diagram showing the structural connection of various components inside a conventional optical scanning device. As shown in FIG. 1, the optical scanning device includes a charge-coupled device (CCD) 110, a multiplexer 120, an amplifier 130, an analogue-to-digital converter 140 and a buffer memory unit 150. In a scanning operation, the charge-coupled device 110 scans the brightness level of a scan object and converts the brightness level into an analogue voltage signal. The analogue voltage signal is output to the amplifier 130 according to the color sequence. The amplifier 130 amplifies the analogue voltage signal and passes the amplified signal to the analogue-to-digital converter 140. The analogue-to-digital converter 140 converts the amplified analogue voltage signal to a digital voltage signal and stores it inside the buffer memory unit 150.

According to the aforementioned data output and conversion system, if the line difference between sequential sensing rows for each color in the charge-coupled device 110 is k and the number of pixels is n, the digital voltage signals inside the buffer memory unit 150 are stored in a manner shown in FIG. 2. As shown in FIG. 2, Rij represents the brightness level of red color in the $i^{th}$ column and the $j^{th}$ pixel, Gij represents the brightness level of green color in the $i^{th}$ column and the $j^{th}$ pixel and Bij represents the brightness level of blue color in the $i^{th}$ column and the $j^{th}$ pixel.

In a conventional scanning system, the data stored up inside buffer memory unit 150 may be processed in two possible schemes. The data inside the buffer memory unit 150 may be directly output to a host computer or the data may be processed so that the color of various pixels are rearranged before outputting. Although the buffer memory unit 150 may output data a lot faster if the former scheme is used, necessary processing of image data inside the host computer is greatly increased. On the other hand, although the amount of processing inside the host computer is very much simplified in the latter scheme, data outputting rate from the buffer memory unit 150 slows down considerably. In other words, conventional image data sequencing methods lead to either post-processing complications or a slow down of the data transfer rate from the memory unit to the host system.

SUMMARY OF THE INVENTION

Accordingly, one object of the present invention is to provide an image data sequencing method for a memory unit inside an optical scanning device. The method is able to reduce post-processing complications inside a host system and at the same time increase data transfer rate from the memory unit to the host system.

To achieve these and other advantages and in accordance with the purpose of the invention, as embodied and broadly described herein, the invention provides an image data sequencing method for a memory unit inside an optical scanning device. The image data sequencing method is particularly suitable for scanning a line containing a plurality of predefined areas, referred to as pixels, wherein each pixel comprises a plurality of primary colors. The image data sequencing method involves the following steps. First, a line of pixels is scanned to obtain all the data for one of the primary colors. The pixels that make up the scan line are subdivided into groups. Inside the memory unit, a storage space is reserved both before and after the scanned primary color data address space so that all the primary color data constituting a pixel are in a fixed sequence next to each other inside the memory unit. When all the primary color data of pixels within a group are secured, the group of data is released from the memory unit.

This invention also provides a second image data sequencing method for a memory unit inside an optical scanning device. The image data sequencing method includes the following steps. First, a line is scanned to obtain a plurality of pixel data. The pixels are divided into a few groups and stored inside the memory unit. As soon as all pixel data within a group is secured and the primary colors constituting these pixels are all arranged in a fixed order, pixel data belonging to the group is released from the memory unit.

This invention also provides a third image data sequencing method for a memory unit inside an optical scanning device. The image data sequencing method is particularly suitable for scanning a line of pixels with each pixel comprising a plurality of primary colors. The image data sequencing method involves the following steps. First, a line of pixels is scanned to obtain all the pixel data for one of the primary colors. All the odd pixels of the scanned line are gathered to form a first group and all the even pixels of the scanned line are gathered to form a second group. When the first or the second group of pixel data is stored inside the memory unit, storage space is reserved both in front of and behind the scanned primary color data address space. Hence, all the primary color data belonging to the same pixel are in a fixed sequence next to each other inside the memory unit. When all the primary color data of pixels within the first group or the second group are secured, data belonging to the group is released from the memory unit.

In brief, after securing constituent data (brightness level of various primary colors) necessary for setting a pixel, the data are rearranged in a specified sequence and stored inside the memory unit. The data are then released from the memory unit directly. With this arrangement, there is no need to conduct additional processing outside the memory unit, so that a relatively fast data transfer rate can be maintained. Furthermore, since the data is sequenced before release from the memory unit, post-processing of the image is greatly simplified.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 3A to 3C are three different data storage configurations inside the memory unit of an optical scanning device according to an image data sequencing method of this invention.

DESCRIPTION OF THE PREFERRED EMBODIMENTS

Figures 1, 2:
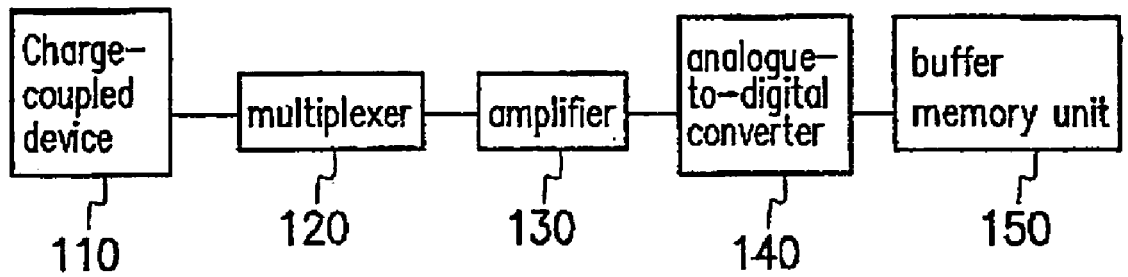
FIG. 1 is a block diagram showing the structural connection of various components inside a conventional optical scanning device.
FIG. 2 is a diagram showing the image data sequencing method used by the memory unit of a conventional optical scanning device.

Reference will now be made in detail to the present preferred embodiments of the invention, examples of which are illustrated in the accompanying drawings. Wherever possible, the same reference numbers are used in the drawings and the description to refer to the same or like parts.

FIGS. 3A to 3C are three different data storage configurations inside the memory unit of an optical scanning device according to an image data sequencing method of this invention. Although the three primary colors including red, green and blue (labeled as R, G and B) are the image data to be retrieved in this scanning operation, the same principles also apply to the secondary colors magenta, yellow and cyan. In addition, various row sensors in an optical scanner for scanning a document are ordered in the sequence red, green, blue and different primary colors are separated from each other by k lines. Again, although image data of various primary colors are divided up into odd pixels or even pixels in this invention, there is no reason to restrict the number of divisions to two as such.

FIG. 3A shows the data sequence arrangement in the memory unit for a condition such that the row of red sensors have just passed over a scan document but the row of green sensors and the row of blue sensors have not yet reached the scanning position. As shown in FIG. 3A, when the row of red sensors scans the document, image data representing the primary color red and labeled $R_{11}$, $R_{12}$, $R_{13}$ up to $R_{k(2n)}$ are stored inside the memory unit first. The lower index k and 2n of R represents the $2n^{th}$ image data point in the $k^{th}$ column. For example, $R_{11}$ represents the first image data point for the primary color red in the first column while $R_{12}$ represents the second image data point for the primary color red in the first column.

As soon as the scanning operation is initialized, the red image data of the odd numbered pixels in the first column are the first group of data to be stored inside the memory unit. In other words, image data $R_{11}$, $R_{13}$, $R_{15}$ up to $R_{1(2n-1)}$ are transferred to the memory unit first as shown in FIG. 3A. Next, the red image data of the odd numbered pixels in the second column and the red image data of the even numbered pixels in the first column are scanned and transferred to the memory unit. That means, image data $R_{21}$, $R_{23}$, $R_{25}$ up to $R_{2(2n-1)}$ and image data $R_{12}$, $R_{14}$, $R_{16}$ up to $R_{1(2n)}$ are transferred to the memory unit next as shown in FIG. 3A. According to this invention, empty spaces are also reserved in the memory unit for holding the data of two other primary colors. For example, memory spaces $N_{11}$ and $M_{11}$ are reserved right after the space $R_{11}$ for holding the primary color red. Here, N and M represent memory space for holding the data of the primary color green and the data of the primary color blue respectively. Because the sensor rows of different primary colors are separated from each other by k lines, data for the primary colors green and blue remain to be written into the memory unit when the data of the primary color red in the $k^{th}$ line is transferred to the memory unit.

FIG. 3B shows the data sequence arrangement in the memory unit for a condition after FIG. 3A such that the row of green sensors have just passed over a scan document but the row of blue sensors have not yet reached the scanning position. Similarly, $G_{11}$ represents the first image data point for the primary color green in the first column while $G_{12}$ represents the second image data point for the primary color green in the first column. As shown in FIG. 3B, image data corresponding to the second primary color (green in this embodiment) is placed behind a slot for holding the image data corresponding to the first primary color (red in this embodiment). In other words, image data of the primary color green is sequentially transferred to the specially reserved memory space $N_{11}$, $N_{12}$, $N_{13}$ up to $N_{k(2n)}$ shown in FIG. 3A according to the position of the scan document.

FIG. 3B also shows storage spaces $R_{(k+1)1}$, $R_{(k+1)(2n-1)}$ up to $R_{(2k)(2n)}$ for holding image data for the primary color red and the reserved storage spaces $N_{(k+1)1}$ to $N_{(2k)(2n)}$ and $M_{(k+1)1}$ to $M_{(2k)(2n)}$ aside from the ones shown in FIG. 3A. Because the sensor rows of different primary colors are separated from each other by k lines, data for the primary color green and blue remain to be written into the memory space from the $k^{th}$ to the $2k^{th}$ line of the memory unit when the data of the primary color red in the $2k^{th}$ line is transferred to the memory unit.

FIG. 3C shows the data sequence arrangement in the memory unit for a condition following FIG. 3B after the sensing row for the third primary color (blue in this embodiment) has just passed over a scan document. As shown in FIG. 3A, when the row of blue sensors scans the first line on the document, image data representing the primary color blue are transferred to reserved storage spaces. In other words, image data of the primary color blue scanned from the first line of the document is transferred to locations $B_{11}$, $B_{12}$ up to $B_{1(2n)}$ as shown in FIG. 3C. Required image data that constitutes the first line is complete after the image data for the primary color blue on the first line is transferred to the memory unit. Thereafter, the first line image data stored inside the memory unit is transferred out to a host system for further image processing.

Linear optical sensors are used to scan a document according to the embodiment of this invention. In other words, one row of sensors is responsible for scanning a primary color. Hence, image data in the odd and the even-numbered pixels are extracted simultaneously. However, staggered optical sensors may also be used such that the odd-numbered pixels and the even-numbered pixels are alternately sensed. If the odd-numbered pixels are scanned first followed by the even-numbered pixels, odd-numbered pixel image data of the primary color blue B11, B13 up to B1(2n−1) as shown in FIG. 3C are secured first. Since a complete set of image data for the odd-numbered pixels is stored inside the memory unit, image data of the odd-numbered pixels may be transferred from the memory unit to the host system first. Image data of the even-numbered pixels are transferred to the host system only after the memory unit has similarly obtained a full set of image data for the even-numbered pixels.

This invention separates each line of image data into several portions inside a memory unit so that a complete set of data in one particular portion may be transferred in sequence to a host system for further processing without having to wait for a full set of image data. Hence, memory space inside the scanning device is saved. Moreover, as long as the host system follows the image data assembling sequence as defined by the memory unit, the host system need not spend any time to sequence the primary color sequence of various pixel image data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of sequencing image data comprising:
   scanning a line to obtain pixel data for one of a plurality of primary or secondary colors;
   dividing the scanned data into a first group containing odd-numbered pixel data and a second group containing even-numbered pixel data; and
   sending the first group of pixel data or the second group of pixel data to a memory unit and reserving a storage space in front of and behind an address space for the sent pixel data so that primary or secondary color data constituting a pixel are subsequently arranged in a fixed sequence next to each other inside said memory unit.

2. The method of claim 1, and further comprising transmitting said pixel data of the primary or secondary colors after a set of the primary or secondary colors belonging either to the first group or the second group is accumulated inside said memory unit.

3. The method of claim 2, wherein the primary colors comprise red, green and blue, and wherein the secondary colors comprise magenta, yellow and cyan.

4. A method of sequencing data, comprising:
   dividing data obtained by scanning a line of pixels into groups;
   sending said data to a memory unit;
   arranging a plurality of primary or secondary color data constituting a pixel in a fixed sequence in said memory unit; and
   sending out the data belonging to one of the groups after said memory unit has accumulated the pixel data of said one of the groups.

5. The method of claim 4, wherein dividing the scanned data into groups comprises:
   gathering odd-numbered pixel data together to form a first group; and
   gathering even-numbered pixel data together to form a second group.

6. The method of claim 4, wherein the primary colors comprise red, green and blue and wherein the secondary colors comprise magenta, yellow and cyan.

7. The method of claim 4, wherein sending said data to the memory unit comprises:
   securing pixel data of one primary or secondary color; and
   reserving a storage space before and after an address space associated with said pixel data, so that the primary or secondary colors constituting a pixel are subsequently arranged in a fixed sequence within said memory unit.

8. The method of claim 7, wherein the primary or secondary colors constituting a pixel are subsequently arranged next to each other in said fixed sequence.

9. A method of sequencing image data comprising:
   securing pixel data from a scan line, said pixel data corresponding to a primary or secondary color:
   dividing pixels of the scanned line into groups;
   reserving a storage space before and after an address space for holding the secured primary or secondary color data so that the primary or secondary colors constituting a pixel are subsequently arranged in a fixed sequence within the memory unit; and
   sending out the pixel data of the primary or secondary colors after a set of the primary or secondary colors belonging to one of the groups is accumulated inside the memory unit.

10. The method of claim 9, wherein dividing pixels of the scanned line into groups comprises:
    gathering the odd-numbered pixel data together to form a first group; and
    gathering the even-numbered pixel data together to form a second group.

11. The method of claim 9, wherein the primary colors comprise red, green and blue, and wherein the secondary colors comprise magenta, yellow and cyan.

12. The method of claim 9, wherein the primary or secondary colors constituting a pixel are subsequently arranged next to each other in said fixed sequence.

13. An apparatus comprising:
    a scanner having a configuration to store pixel data belonging to a first group or a second group in a memory unit at a first address space, wherein said first group comprises even-numbered pixels and wherein said second group comprises odd-numbered pixels, wherein an address space before and after an address the first address space are reserved so that a plurality of pixel data corresponding to a pixel of said first group or said second group are subsequently arranged in a sequence inside said memory unit, wherein said pixel data comprises primary or secondary color data associated with said pixel.

14. The apparatus of claim 13, wherein primary colors comprise red, blue, and green, and wherein secondary colors comprise magenta, yellow, and cyan.

15. The apparatus of claim 14, wherein said scanner further has a configuration to transmit pixel data once a plurality of pixel data from said first group or said second group is stored in said memory unit.

* * * * *

UNITED STATES PATENT AND TRADEMARK OFFICE
CERTIFICATE OF CORRECTION

PATENT NO. : 7,218,428 B2
APPLICATION NO. : 10/068278
DATED : May 15, 2007
INVENTOR(S) : Chang et al.

Page 1 of 1

It is certified that error appears in the above-identified patent and that said Letters Patent is hereby corrected as shown below:

On the Title Pg, Item (76), please replace "Hsiao Kang District" with --Hsiao-Kang District--.
    At column 6, line 9, please replace "secondary color:" with --secondary color;--.
    At column 6, line 39, please replace "after an address" with --an address space after--.

Signed and Sealed this

Eighteenth Day of May, 2010

David J. Kappos
*Director of the United States Patent and Trademark Office*